(12) United States Patent
Tong et al.

(10) Patent No.: US 11,562,123 B2
(45) Date of Patent: Jan. 24, 2023

(54) METHOD AND APPARATUS FOR FUSING POSITION INFORMATION, AND NON-TRANSITORY COMPUTER-READABLE RECORDING MEDIUM

(71) Applicants: Yixuan Tong, Beijing (CN); Yongwei Zhang, Beijing (CN); Bin Dong, Beijing (CN); Shanshan Jiang, Beijing (CN); Jiashi Zhang, Beijing (CN)

(72) Inventors: Yixuan Tong, Beijing (CN); Yongwei Zhang, Beijing (CN); Bin Dong, Beijing (CN); Shanshan Jiang, Beijing (CN); Jiashi Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 81 days.

(21) Appl. No.: 17/215,068

(22) Filed: Mar. 29, 2021

(65) Prior Publication Data
US 2021/0303777 A1   Sep. 30, 2021

(30) Foreign Application Priority Data
Mar. 30, 2020 (CN) .......................... 202010238604.5

(51) Int. Cl.
*G06F 40/166* (2020.01)
*G06K 9/62* (2022.01)
*G06N 3/08* (2006.01)

(52) U.S. Cl.
CPC ......... *G06F 40/166* (2020.01); *G06K 9/6215* (2013.01); *G06K 9/6261* (2013.01); *G06K 9/6289* (2013.01); *G06N 3/08* (2013.01)

(58) Field of Classification Search
CPC .. G06F 40/166; G06K 9/6215; G06K 9/6261; G06K 9/6289; G06N 3/08
See application file for complete search history.

(56) References Cited

U.S. PATENT DOCUMENTS

| | | | | |
|---|---|---|---|---|
| 5,704,005 A | * | 12/1997 | Iwamida | G10L 15/187 704/238 |
| 2014/0210830 A1 | * | 7/2014 | Latorre-Martinez | G06T 13/205 345/473 |
| 2020/0175119 A1 | * | 6/2020 | Chung | G06F 40/289 |

(Continued)

OTHER PUBLICATIONS

Ashish Vaswani et al., by Google machine translation team, "Attention is all you need," arXiv:1706.03762v3 [cs.CL] Jun. 20, 2017.

*Primary Examiner* — Thu V Huynh
(74) *Attorney, Agent, or Firm* — IPUSA, PLLC

(57) ABSTRACT

A method and an apparatus for fusing position information, and a non-transitory computer-readable recording medium are provided. In the method, words of an input sentence are segmented to obtain a first sequence of words in the input sentence, and absolute position information of the words in the first sequence is generated. Then, subwords of the words in the first sequence are segmented to obtain a second sequence including subwords, and position information of the subwords in the second sequence are generated, based on the absolute position information of the words in the first sequence, to which the respective subwords belong. Then, the position information of the subwords in the second sequence are fused into a self-attention model to perform model training or model prediction.

17 Claims, 5 Drawing Sheets

| ORIGINAL SENTENCE | SHI RYO WA TO YAMA KEN FU GAN UN GA NO TEI SHITSU O MOCHI I TA | | | | | | | | | | | |
|---|---|---|---|---|---|---|---|---|---|---|---|---|
| WORD SEGMENTATION RESULT | SHIRYO/WA/TOYAMA/KEN/FUGAN/UNGA/NO/TEISHITSU/O/MOCHII/TA | | | | | | | | | | | |
| SUBWORD SEGMENTATION RESULT | SHIRYO | WA | TOYAMA | KEN | FU@@ | GAN | UN@@ | GA | NO | TEISHITSU | O | MOCHII | TA |
| POSITION INFORMATION OF SUBWORD | 0 | 1 | 2 | 3 | 4 | 4 | 5 | 5 | 6 | 7 | 8 | 9 | 10 |

(56) References Cited

U.S. PATENT DOCUMENTS

2021/0049327 A1* 2/2021 Hu ..................... G06F 40/284
2021/0141798 A1* 5/2021 Steedman Henderson ..................
G06N 3/0454

* cited by examiner

FIG.2

| ORIGINAL SENTENCE | SHI RYO WA TO YAMA KEN FU GAN UN GA NO TEI SHITSU O MOCHI I TA | | | | | | | | | | |
|---|---|---|---|---|---|---|---|---|---|---|---|
| WORD SEGMENTATION RESULT | SHIRYO/WA/TOYAMA/KEN/FUGAN/UNGA/NO/TEISHITSU/O/MOCHII/TA | | | | | | | | | | |
| SUBWORD SEGMENTATION RESULT | SHIRYO | WA | TOYAMA | KEN | FU@@ | GAN | UN@@ | GA | NO | TEISHITSU | O | MOCHII | TA |
| POSITION INFORMATION OF SUBWORD | 0 | 1 | 2 | 3 | 4 | 4 | 5 | 5 | 6 | 7 | 8 | 9 | 10 |

FIG.3

| SUBWORD t | SUBWORD i | POSITION INFORMATION OF SUBWORD |
|---|---|---|
| SHIRYO | GA | 11 |
| SHIRYO | FU@@ | 10 |
| SHIRYO | TOYAMA | 8 |
| SHIRYO | TEISHITSU | 12 |
| GAN | FU@@ | 6 |
| GAN | TOYAMA | 4 |
| GAN | MOCHII | 11 |

METHOD AND APPARATUS FOR FUSING POSITION INFORMATION, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 202010238604.5 filed on Mar. 30, 2020, the entire contents of which are incorporated herein by reference.

BACKGROUND OF THE INVENTION

1. Field of the Invention

The present invention relates to the field of natural language processing (NLP), and specifically, a method and an apparatus for fusing position information, and a non-transitory computer-readable recording medium.

2. Description of the Related Art

In recent years, attention mechanisms have been widely used in natural language processing tasks based on deep learning. With the intensive study of the attention mechanisms, various attention models have been proposed by researchers. In June 2017, the article "Attention is all you need" published by a Google machine translation team on arXiv has attracted widespread attention in the industry. The self-attention mechanism has become a research hotspot in the attention mechanism of neural networks, and good results have also been achieved.

The self-attention model (also referred to as "the self-attention network model") generates a representation with context information by applying attention to each pair of elements in an input sequence. Compared with convolutional neural networks (CNN) and recurrent neural networks (RNN), the self-attention model is more flexible in both long-distance and local correlation modeling.

In natural language processing, a smaller vocabulary list may help to improve, the performance of systems. For example, it is usually desirable to set a smaller vocabulary list in the sequence-to-sequence model of machine translation or dialogue. However, in convention word representation methods, out-of-vocabulary (OOV) problems may arise, thereby making it difficult to deal with unknown or rare words. If a smaller vocabulary list is used, the OOV problem will become more prominent.

In order to reduce the size of the vocabulary list and the number of unknown words, various subword segmentation algorithms may be used to further divide the word into at least one subword, which is also referred to as a "wordpiece". The granularity of subwords is between the granularity of words and the granularity of characters, which can better balance the OOV problem. The subword segmentation algorithm that is used to divide words in the model has become an important method to improve the performance of the model. Common subword segmentation algorithms include byte pair encoding (BPE) algorithms and unigram language model (ULM) algorithms.

After introducing the subword segmentation algorithm into self-attention models, there is a need to provide a method for processing original word position information. By using the word position information, subsequent tasks can obtain more accurate word position information and ensure the accuracy of the model.

SUMMARY OF THE INVENTION

According to an aspect of the present invention, a method for fusing position information is provided. The method includes performing segmenting words of an input sentence to obtain a first sequence of words in the input sentence, and generating absolute position information of the words in the first sequence; segmenting subwords of the words in the first sequence to obtain a second sequence including subwords, and generating, based on the absolute position information of the words in the first sequence, to which the respective subwords belong, position information of the subwords in the second sequence; and fusing the position information of the subwords in the second sequence into a self-attention model to perform model training or model prediction.

According to another aspect of the present invention, an apparatus for fusing position information is provided. The apparatus includes a memory storing computer-executable instructions; and one or more processors. The one or more processors are configured to execute the computer-executable instructions such that the one or more processors are configured to segment words of an input sentence to obtain a first sequence of words in the input sentence, and generate absolute position information of the words in the first sequence; segment subwords of the words in the first sequence to obtain a second sequence including subwords, and generate, based on the absolute position information of the words in the first sequence, to which the respective subwords belong, position information of the subwords in the second sequence; and fuse the position information of the subwords in the second sequence into a self-attention model to perform model training or model prediction.

According to another aspect of the present invention, a non-transitory computer-readable recording medium having computer-executable instructions for execution by one or more processors is provided. The computer-executable instructions, when executed, cause the one or more processors to carry out a method for fusing position information. The method includes segmenting words of an input sentence to obtain a first sequence of words in the input sentence, and generating absolute position information of the words in the first sequence; segmenting subwords of the words in the first sequence to obtain a second sequence including subwords, and generating, based on the absolute position information of the words in the first sequence, to which the respective subwords belong, position information of the subwords in the second sequence; and fusing the position information of the subwords in the second sequence into a self-attention model to perform model training or model prediction.

BRIEF DESCRIPTION OF THE DRAWINGS

The above and other objects, features and advantages of the present invention will be further clarified the following detailed description of embodiments of the present invention in combination with the drawings.

FIG. 2 is a schematic diagram illustrating an example of word segmentation and subword segmentation according to an embodiment of the present invention.

FIG. 3 is a schematic diagram illustrating an example of position information of subwords according to an embodiment of the present invention.

DESCRIPTION OF THE EMBODIMENTS

Figure 1:
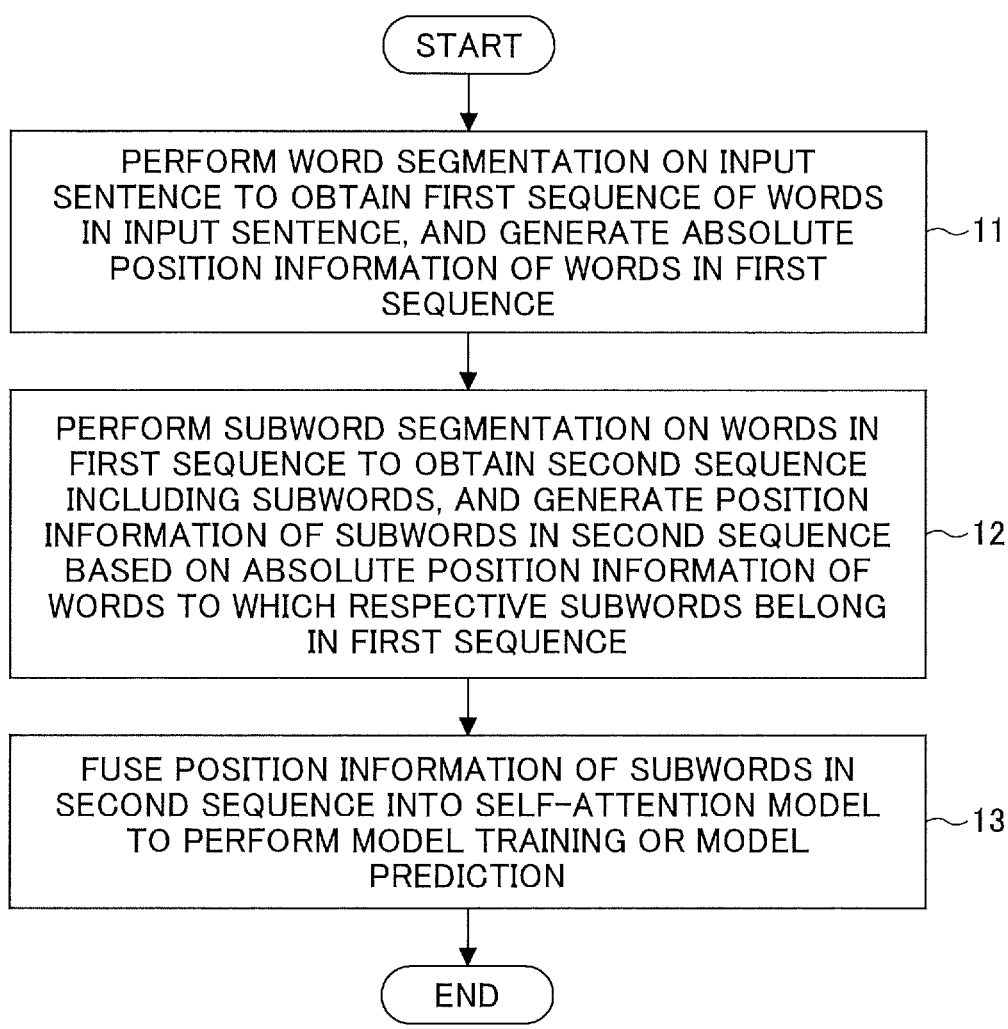
FIG. 1 is a flowchart illustrating a position information fusing method according to an embodiment of the present invention.

In the following, specific embodiments of the present invention will be described in detail with reference to the accompanying drawings, so as to facilitate the understanding of technical problems to be solved by the present invention, technical solutions of the present invention, and advantages of the present invention. The present invention is not limited to the specifically described embodiments, and various modifications, combinations and replacements may be made without departing from the scope of the present invention. In addition, descriptions of well-known functions and constructions are omitted for clarity and conciseness.

Note that "one embodiment" or "an embodiment" mentioned in the present specification means that specific features, structures or characteristics relating to the embodiment are included in at least one embodiment of the present invention. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed in sequential order, however the order in which the steps are performed is not limited to a sequential order. Further, the described steps may be performed in parallel or independently.

In order to facilitate the understanding of the embodiments of the present invention, concepts relating to the embodiments of the present invention will be briefly described.

1. Word

Words are the smallest unit that can be used independently in a language, and words have an independent position and function in the syntactic structure. For example, in English, the word usually refers to an English word that includes one or more English letters. Furthermore, in English sentence representation, there are usually one or more spaces or punctuation marks between words. In Chinese, the word usually refer to a Chinese word that includes one or more Chinese characters. In Chinese sentence representation, there is usually no separator between words.

2. Character

Characters described herein usually refer to letters in English, Chinese characters in Chinese, and various punctuation marks (such as periods, commas, etc.).

3. Subword

Subwords, which are also referred to as "wordpieces", are text representation units between characters and words. For example, the English word "workload", which includes eight characters, may be divided into two subwords "work" and "load", and may also be divided into three subwords "work", "lo" and "ad". As another example, the Chinese word "Sheng Ming Tan Ce Yi", which includes five characters, may be divided into two subwords "ShengMing" and "TanCe Yi", and may also be divided into three subwords "ShengMing", "TanCe" and "Yi".

In view of the problem of the conventional technology, an object of the embodiments of the present invention is to provide a method and an apparatus for fusing position information, and a non-transitory computer-readable recording medium that introduce subwords in a self-attention model, and fuse word position information based on absolute positions of words into a model input feature, thereby obtaining more accurate position information in subsequent tasks, and improving the accuracy of the model.

In an embodiment of the present invention, a position information fusing method is provided. FIG. 1 is a flowchart illustrating the position information fusing method according to the embodiment of the present invention. As shown in FIG. 1, the position information fusing method according to the embodiment of the present invention includes steps 11 to 13.

In step 11, words of an input sentence are segmented to obtain a first sequence of words in the input sentence, and absolute position information of the words in the first sequence is generated.

Here, the input sentence may be a training sentence for training a model, and may also be a sentence to be processed, which is provided to the model for prediction or conversion (such as translation). The word segmentation divides the input sentence into a sequence of words (namely, the first sequence), and specifically, may be performed by various word segmentation tools or word segmentation algorithms.

For example, in the embodiment of the present invention, an original sentence sequence may be divided into word sequences using a natural language toolkit (NLTK) of a python library.

As another example, in the embodiment of the present invention, word segmentation may be performed using a dictionary-based word segmentation algorithm, such as a maximum matching word segmentation algorithm, a shortest path word segmentation algorithm, etc., and may also be performed using a word-based word segmentation algorithm, such as a generative model word segmentation algorithm, a discriminative model word segmentation algorithm, etc. The generative model includes an n-gram model, a hidden Markov model (HMM), a naive Bayes classification, etc. The discriminative model includes a perceptron model, a conditional random field (CRF) model, etc.

In the embodiment of the present invention, after the word segmentation, absolute position information of each word in the first sequence is also recorded. For example, for the first word in the first sequence, the absolute position may be recorded as 0, and the absolute positions of subsequent words may be 1, 2, 3, . . . , and so on.

In addition, in the embodiment of the present invention, before the word segmentation in step 11, preprocessing may be performed on the input sentence, which may specifically include data format conversion and data cleaning. Here, the data format conversion is mainly to convert the original data format into a target format that is easily used. The data cleaning is mainly to remove noise in the data. The noise usually includes uniform resource locators (URL), e-mail addresses, and symbols introduced by web pages such as "<", ">", etc. XML tags such as "<html>", "<title>", "<body>", etc., are removed, and only a text between the tags is retained.

In step 12, subwords of the words in the first sequence are segmented to obtain a second sequence including subwords, and position information of the subwords in the second sequence are generated based on the absolute position information of the words in the first sequence, to which the respective subwords belong.

Here, in the embodiment of the present invention, the subword segmentation may be performed on the words in the first sequence using a subword segmentation algorithm such as a BPE algorithm, a ULM algorithm, etc. Thus, each word may be divided into at least one subword, so as to obtain the second sequence of the words. Note that, some words may not be able to be further divided. In this case, it may be considered that the subword after the word segmentation is the word itself.

As an example, in the embodiment of the present invention, the words in the first sequence may be divided using an open source tool subword-nmt based on a BPE algorithm. The method is specifically as follows.

(i) Train a segmentation model. The segmentation model may be jointly trained using texts of a source end and a target end, where a hyperparameter "s" may be set to 15000.

(ii) Segment word sequences of the source end and the target end using the trained segmentation model, where a hyperparameter "vocabulary-threshold" may be set to 50.

In the embodiment of the present invention, the position information of the subword may use a relative position or an absolute position.

For example, in a case where the absolute position is used, the absolute position information of the word in the first sequence, to which the subword belongs, may be directly set as the position information of the subword.

FIG. 2 is a schematic diagram illustrating an example of word segmentation and subword segmentation according to an embodiment of the present invention. As shown in FIG. 2, taking a Japanese sentence "Shi Ryo Wa To Yama Ken Fu Gan Un Ga No Tei Shitsu O Mochi I Ta" as an example, an example of a sequence obtained after a word segmentation and a subword segmentation of the sentence is provided. As shown in FIG. 2, the absolute position information of the words in the first sequence, to which the subwords belong, are directly set as the position information of the subwords.

It can be seen from FIG. 2 that the first sequence obtained after performing the word segmentation on the Japanese sentence "Shi Ryo Wa To Yama Ken Fu Gan Un Ga No Tei Shitsu O Mochi I Ta" is "ShiRyo/Wa/ToYama/Ken/FuGan/UnGa/No/TeiShitsu/O/Mochi I/Ta", where the mark "/" indicates separators between adjacent words. Here, 0 is the absolute position of the first word, and the first sequence includes eleven words from the word absolute position 0 to 10, namely, "ShiRyo", "Wa", "ToYama", "Ken", "FuGan", "UnGa", "No", "TeiShitsu", "O", Mochil" and "Ta". After the subword segmentation is performed on the words in the first sequence, the subword obtained after performing the segmentation on the word "ShiRyo" whose absolute position is 0 is still "ShiRyo", namely, the word itself. The subwords obtained after performing the segmentation on the word "FuGan" whose absolute position is 4 is "Fu@@" and "Gan". The position information of the subwords "Fu@@" and "Gan" are the same, namely 4, because the subwords "Fu@@" and "Gan" are segmented from the same word "FuGan" in the first sequence, that is to say, the words in the first sequence, to which the subwords "Fu@@" and "Gan" belong, are the same word. Similarly, the position information of the subwords "Un@@" and "Ga" are the same, namely 5, because the subwords "Un@@" and "Ga" are segmented from the same word "UnGa" in the first sequence whose absolute position is 5. Here, the mark "@@" indicates in the above subword indicates that the subword is the first subword among a plurality of subwords obtained by dividing the word.

As another example, in a case where the relative position is used, a relative distance between a target subword and a reference subword in the second sequence is calculated based on a first absolute position information and a second absolute position information, and the position information of the target subword is generated based on the relative distance. The position information is a metric of the relative position between the target subword and the reference subword. The first absolute position information is the absolute position information of a target word to which the target subword i belongs in the first sequence, and the second absolute position information is the absolute position information of a reference word in the first sequence, to which the reference subword t belongs. Here, i indicates that the target subword is the i-th subword in the second sequence, and t indicates that the reference subword is the t-th subword in the second sequence.

A calculation method of the position information of the above target subword is specifically as follows.

$$\text{Distance}_{t,i} = \min(s, \max(-s, \text{Position}_i - \text{Position}_t)) + s \quad (1)$$

Here, $\text{Position}_i$ and $\text{Position}_t$ indicate the first absolute position information and the second absolute position information, respectively. $\text{Position}_i - \text{Position}_t$ indicates the relative distance. s is a hyperparameter, and specifically, a positive integer. $\text{Distance}_{t,i}$ indicates the position information of the target subword i whose value range is 0~2s that includes 2s+1 values. Note that the above formula 1 is only one example of a calculation method for generating the position information based on the relative distance according to the embodiment of the present invention, and the embodiment of the present invention may also use other measuring methods based on the relative distance, so as to introduce the relative distance based on the absolute position information of the word into the position information of the subword. Namely, the embodiment of the present invention is not specifically limited to the above calculation method.

Taking the output in FIG. 2 as an example, the measurement results of the relative position information of the subwords after fusing the position information according to the above formula 1 are shown in FIG. 3, where the value of s is 6.

In step 13, the position information of the subwords in the second sequence are fused into a self-attention model to perform model training or model prediction.

Here, in the embodiment of the present invention, when the second sequence is input to the self-attention model, the position information of the subwords in the second sequence are fused into the self-attention model, thereby performing model training or model prediction. The model training refers to training of a model using the fused position information of the subwords to obtain a desired model. The model prediction refers to prediction processing, such as translation, using a trained model.

In the embodiment of the present invention, because the position information of the subword is generated based on the position information of the word, to which the subword belongs, the word position information based on the absolute position of the word is fused into the model input feature, thus it is possible to minimize the representation error caused by the absolute position of the subword, thereby obtaining more accurate position information in subsequent tasks. Furthermore, in the embodiment of the present invention, because position representation is generated based on the absolute position of the word, it is possible to minimize the erroneous information contained in the position representation, thereby improving the accuracy of the model.

For example, taking the absolute position as an example, in the embodiment of the present invention, the position information of the subword may be mapped to one M-dimensional vector with a mapping process. The M is a predetermined hyperparameter. Then, the M-dimensional vector is fused with a word vector of the subword, and the fused vector is input to the self-attention model.

As another example, taking the relative position as an example, in the embodiment of the present invention, the position information of the target subword may be mapped to three N-dimensional vectors that correspond respective input vectors Q, K and V of the self-attention model with a mapping process. The N is a predetermined hyperparameter. Then, the three N-dimensional vectors are fused with the respective input vectors Q, K and V, respectively, and the fused vectors are input to the self-attention model.

Specifically, in order to generate the N-dimensional vectors or the M-dimensional vector, the above mapping process may include at least one of a calculation process based on a sine function, a calculation process based on a cosine function, a calculation process based on a sine function and a cosine function, and an operation based on a newly introduced trainable model parameter.

In the following, the method for fusing the position information of the subwords into the self-attention model according to the embodiment of the present invention will be further described with reference to an example of a mapping process based on trainable model parameters.

(1) Randomly initialize three matrices having dimensions of d×(2s+1), where the parameter d is the width of the hidden layer of the self-attention model, supposing d=768. The hyperparameter s is the hyperparameter in the above formula 1. The three matrices are then denoted as: m_q, m_k, and m_v. The parameters in these matrices are optimized together during the model optimization process.

(2) Calculate the distance$_{t,i}$ according to the calculation method of the above formula 1, and obtain the distance$_{t,i}$-th column from the matrix m_q and denote it as Embedding$_{t,i}^{(q)}$ that represents the N-dimensional vector mapped by the relative position information Distance$_{t,i}$ of the subword, where N=d. This vector is the N-dimensional vector corresponding to the input vector Q of the self-attention model. In the same way, the vector Embedding$_{t,i}^{(k)}$ may be obtained from the matrix m_k, and the vector Embedding$_{t,i}^{(v)}$ may be obtained from the matrix m_v, which are the N-dimensional vectors corresponding to the input vectors K and V of the self-attention model, respectively.

Here, Q, K, and V are a query vector, a key vector, and a value vector, respectively, which represent a pair of query and key-value. The query vector Q, the key vector K, and the value vector V are usually generated by multiplying an input vector of an encoder by weight matrices of different dimensions. An attention weight is calculated based on the similarity between the query and the key, and then weighting is performed on the value based on the attention weight to obtain an attention.

(3) For each subword t, its representation is calculated based on the self-attention model. The calculation method is as follows.

$$z_t = \sum_i a_{t,i}(x_i W^V + Embedding_{t,i}^{(v)}) \quad (2)$$

$$a_{t,i} = \frac{e^{C_{t,i}}}{\sum_j e^{C_{t,i}}} \quad (3)$$

$$C_{t,i} = \frac{(x_t W^Q + Embedding_{t,i}^{(q)})(x_i W^K + Embedding_{t,i}^{(k)})}{\sqrt{d}} \quad (4)$$

In the above formulas, $x_i$ and $x_t$ are the distributed representations of the i-th and t-th subwords in the input sequence (such as the second sequence described above), respectively. The hyperparameter d is the width of the hidden layer of the self-attention model. $W^Q$, $W^K$ and $W^V$ are trainable parameter matrices whose size is e×d. The parameter e is the width of the distributed representation of the subword.

In the embodiment of the present invention, according to the above formula, the position information (the relative position information) of the subword t is fused into the self-attention model. Note that the above fusion method is merely an example of the embodiment of the present invention. In this example, the fusion method of vector addition is adopted, namely, the position information of the subwords are fused into the input of the self-attention model, by adding the position information of the subwords to the corresponding input vectors Q, K and V. Alternatively, in the embodiment of the present invention, trainable weight parameters may also be used to perform weighting on the N-dimensional vectors mapped by the position information of the subwords in the above formula, and then the weighted N-dimensional vectors may be added to the corresponding input vectors. In addition to the fusion method of the vector addition, in the embodiment of the present invention, vector multiplication, vector splicing, etc., may also be used for fusion, but will not be described in detail here.

In the embodiment of the present invention, after introducing the distributed representations of the subwords into the self-attention model, the word position information based on the absolute positions of the words are fused into the model input feature by the above steps, thus it is possible to obtain more accurate position information in subsequent tasks, thereby improving the accuracy of the model.

Figure 4:
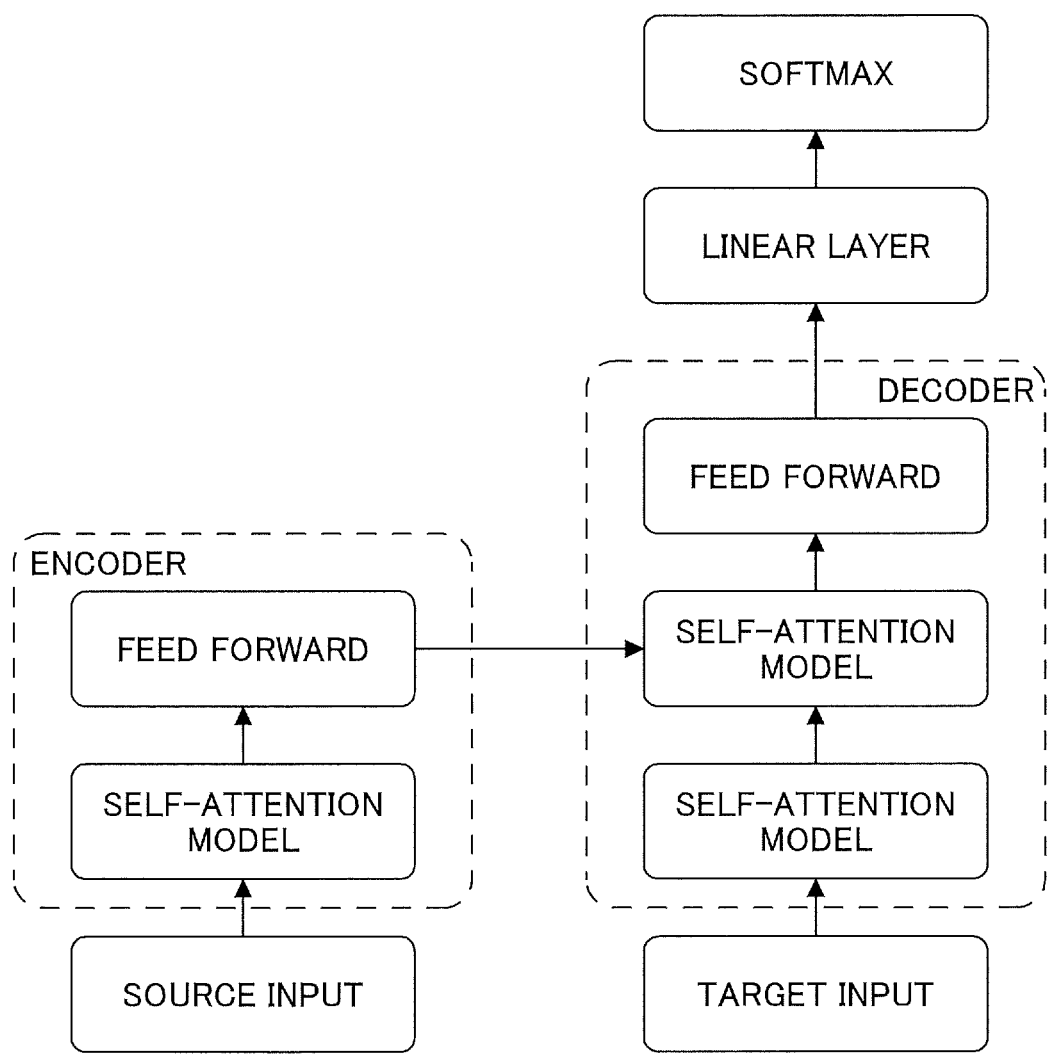
FIG. 4 is a schematic diagram illustrating the configuration of a neural machine translation model according to an embodiment of the present invention.

In order to facilitate the understanding of the above embodiment, the embodiment will be further described with reference to an example of a neural machine translation model based on the self-attention mechanism. FIG. 4 is a schematic diagram illustrating the configuration of the neural machine translation model based on the self-attention mechanism. In FIG. 4, the left portion is an encoder, and the right portion is a decoder. The specific configuration of the neural machine translation model is as follows.

(1) Source input and target input are a distributed representation of an input subword sequence. For example, in a Japanese to Chinese translation model, in a training phase, Japanese and Chinese sentences to be trained are input at a source input side and a target input side, respectively. In a prediction phase, only a Japanese sentence to be translated is input at the source input side.

(2) The self-attention model is a self-attention mechanism module that fuses the position information in the embodiment of the present invention. The self-attention module in the encoder on the left is used to learn the relationship between elements of the input sequence, and the self-attention module in the decoder on the right is used to learn the relationship between the elements of the input sequence, and the relationship between the elements of the input sequence and elements at the encoder side.

(3) The feed forward module maps the results of the self-attention module according to the following formula 5.

$$s_i = \text{Relu}(z_i W_1 + b_1) W_2 + b_2 \qquad (5)$$

In the above formula, $W_1$ and $W_2$ are parameter matrices that have dimensions $d \times d_f$ and $d_f \times d$, respectively. The hyperparameter d is the width of the hidden layer of the self-attention model. The hyperparameter $d_f$ is the width of the middle layer, where $d_f = 1536$. The parameters in these two matrices are adjusted and optimized together during a training process. Relu( ) represents a linear rectification function.

(4) The Linear module maps the model output to the same dimension as a vocabulary list using a parameter matrix.

(5) The Softmax module represents the output layer that normalizes the output to a probability value.

Compared with the conventional technology, in the position information fusing method according to the embodiment of the present invention, a subword segmentation algorithm is introduced into the self-attention model, and the word position information based on the absolute position of the word is fused into the model input feature, thus it is possible to avoid the representation error caused by the absolute position of the subword, thereby obtaining more accurate position information in subsequent tasks. Furthermore, position representation is generated based on the absolute position of the word, thus it is possible to prevent the position representation from containing error information, thereby improving the accuracy of the model.

Figure 5:
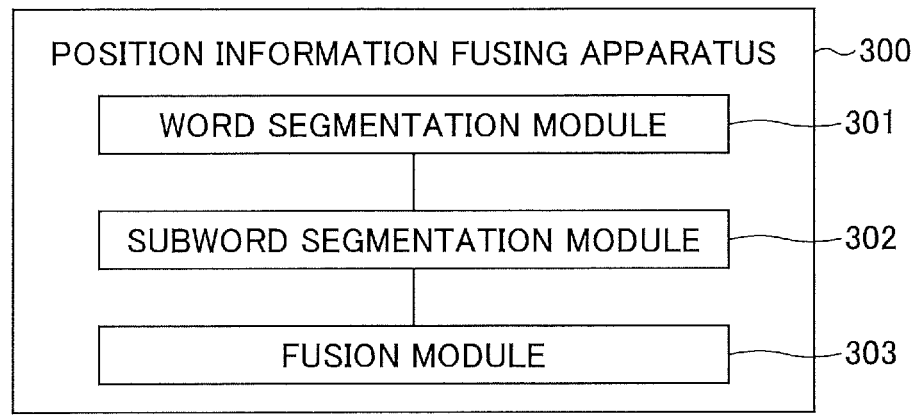
FIG. 5 is a block diagram illustrating the configuration of a position information fusing apparatus according to an embodiment of the present invention.

In another embodiment of the present invention, a position information fusing apparatus 300 is further provided. FIG. 5 is a block diagram illustrating the configuration of the position information fusing apparatus according to the embodiment of the present invention.

As shown in FIG. 5, the position information fusing apparatus 300 specifically includes a word segmentation module 301, a subword segmentation module 302, and a fusion module 303.

The word segmentation module 301 segments words of an input sentence to obtain a first sequence of words in the input sentence, and generates absolute position information of the words in the first sequence.

The subword segmentation module 302 segments subwords of the words in the first sequence to obtain a second sequence including subwords. Then, the subword segmentation module 302 generates position information of the subwords in the second sequence, based on the absolute position information of the words in the first sequence, to which the respective subwords belong.

The fusion module 303 fuses the position information of the subwords in the second sequence into a self-attention model to perform model training or model prediction.

In the position information fusing apparatus 300 of the embodiment of the present invention, the word position information based on the absolute positions of the words are fused into the model input feature by the above modules, thus it is possible to obtain more accurate position information in subsequent tasks, thereby improving the accuracy of the model.

Preferably, the subword segmentation module 302 calculates the relative distance between a target subword and a reference subword in the second sequence, based on a first absolute position information and a second absolute position information. Then, the subword segmentation module 302 generates the position information of the target subword, based on the relative distance.

Here, the first absolute position information is the absolute position information of a target word in the first sequence, to which the target subword belongs. The second absolute position information is the absolute position information of a reference word in the first sequence, to which the reference subword belongs.

Preferably, the fusion module 303 maps the position information of the target subword to three N-dimensional vectors that correspond respective input vectors Q, K and V of the self-attention model with a mapping process. The N is a predetermined hyperparameter. Then, the fusion module 303 fuses the three N-dimensional vectors with the respective input vectors Q, K and V, respectively, and inputs the fused vectors to the self-attention model.

Alternatively, the subword segmentation module 302 sets the absolute position information of the word in the first sequence, to which the subword belongs, as the position information of the subword.

Preferably, the fusion module 303 maps the position information of the subword to one M-dimensional vector with a mapping process. The M is a predetermined hyperparameter. Then, the fusion module 303 fuses the M-dimensional vector with a word vector of the subword, and inputs the fused vector to the self-attention model.

Preferably, the mapping process includes at least one of a calculation process based on a sine function, a calculation process based on a cosine function, a calculation process based on a sine function and a cosine function, and an operation based on a newly introduced trainable model parameter.

Figure 6:
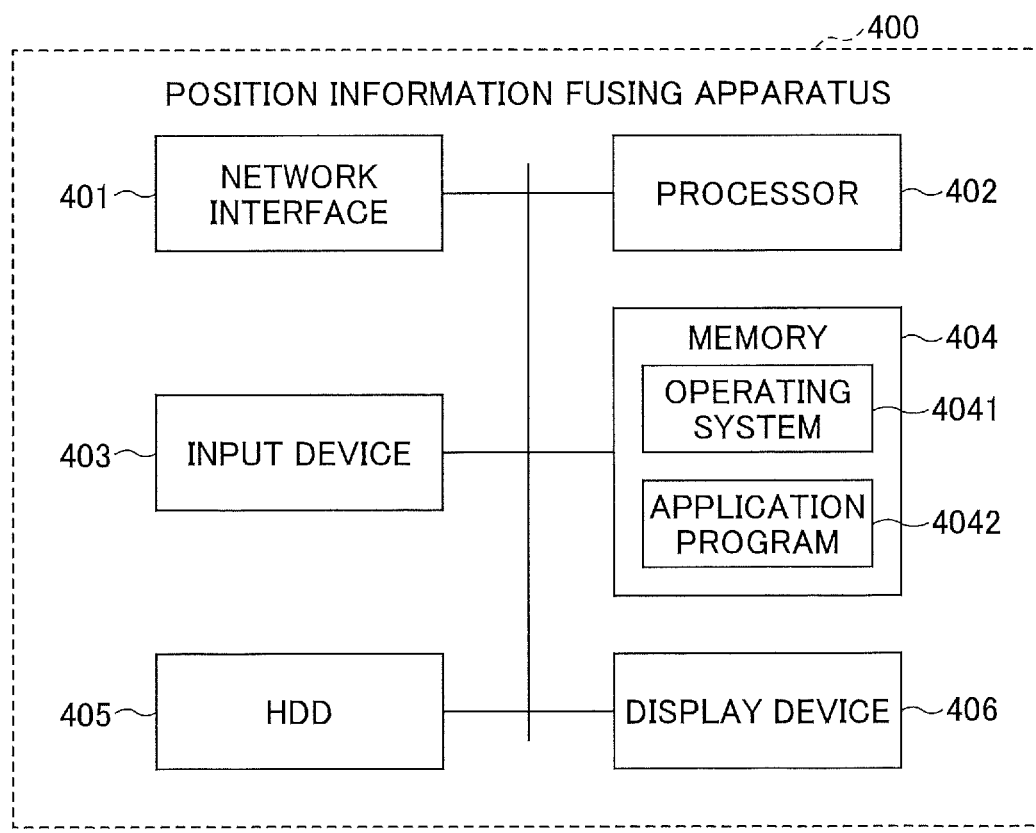
FIG. 6 is a block diagram illustrating the configuration of a position information fusing apparatus according to another embodiment of the present invention.

In another embodiment of the present invention, a position information fusing apparatus 400 is further provided. FIG. 6 is a block diagram illustrating the hardware configuration of the position information fusing apparatus 400 according to the embodiment of the present invention. As shown in FIG. 6, the position information fusing apparatus 400 includes a processor 402, and a memory 404 storing computer-executable instructions.

When the computer-executable instructions are executed by the processor 402, the processor 402 segments words of an input sentence to obtain a first sequence of words in the input sentence, and generates absolute position information of the words in the first sequence. Then, the processor 402 segments subwords of the words in the first sequence to obtain a second sequence including subwords, and generates, based on the absolute position information of the words in the first sequence, to which the respective subwords belong, position information of the subwords in the second sequence. Then, the processor 402 fuses the position information of the subwords in the second sequence into a self-attention model to perform model training or model prediction.

Furthermore, as illustrated in FIG. 6, the position information fusing apparatus 400 further includes a network interface 401, an input device 403, a hard disk drive (HDD) 405, and a display device 406.

Each of the ports and each of the devices may be connected to each other via a bus architecture. The processor 402, such as one or more central processing units (CPUs), and the memory 404, such as one or more memory units, may be connected via various circuits. Other circuits such as an external device, a regulator, and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 401 may be connected to a network (such as the Internet, a LAN or the like), receive data (such as training sentences of a model) from the network, and store the received data in the hard disk drive 405.

The input device 403 may receive various commands such as predetermined threshold and its setting information input by a user, and transmit the commands to the processor 402 to be executed. The input device 403 may include a keyboard, pointing devices (such as a mouse or a track ball), a touch board, a touch panel or the like.

The display device 406 may display a result obtained by executing the commands, for example, a progress of model training.

The memory 404 stores programs and data required for running an operating system, and data such as intermediate results in calculation processes of the processor 402.

Note that the memory 404 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which may be used as an external high-speed buffer. The memory 404 of the apparatus or the method is not limited to the described types of memory, and may include any other suitable memory.

In some embodiments, the memory 404 stores executable modules or data structure, their subsets, or their superset, i.e., an operating system (OS) 4041 and an application program 4042.

The operating system 4041 includes various system programs for implementing various essential tasks and processing tasks based on hardware, such as a frame layer, a core library layer, a drive layer and the like. The application program 4042 includes various application programs for implementing various application tasks, such as a browser and the like. A program for realizing the method according to the embodiments of the present invention may be included in the application program 4042.

The position information fusing method according to the above embodiments of the present invention may be applied to the processor 402 or may be implemented by the processor 402. The processor 402 may be an integrated circuit chip capable of processing signals. Each step of the above method may be implemented by instructions in a form of integrated logic circuit of hardware in the processor 402 or a form of software. The processor 402 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, or alternatively, the processor may be any common processor. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 404, and the processor 402 reads information in the memory 404 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processing devices (DSPD), programmable logic devices (PLD), field programmable gate array signals (FPGA), general-purpose processors, controllers, micro-controllers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

Preferably, when the computer-readable instructions are executed by the processor 402, the processor 402 may calculate, based on a first absolute position information and a second absolute position information, a relative distance between a target subword and a reference subword in the second sequence; and generate, based on the relative distance, the position information of the target subword. The first absolute position information is the absolute position information of a target word in the first sequence, to which the target subword belongs, and the second absolute position information is the absolute position information of a reference word in the first sequence, to which the reference subword belongs.

Preferably, when the computer-readable instructions are executed by the processor 402, the processor 402 may map, with a mapping process, the position information of the target subword to three N-dimensional vectors that correspond respective input vectors Q, K and V of the self-attention model, where N is a predetermined hyperparameter. Then, the processor 402 may fuse the three N-dimensional vectors with the respective input vectors Q, K and V, respectively, and input the fused vectors to the self-attention model.

Preferably, when the computer-readable instructions are executed by the processor 402, the processor 402 may set the absolute position information of the word in the first sequence, to which the subword belongs, as the position information of the subword.

Preferably, when the computer-readable instructions are executed by the processor 402, the processor 402 may map, with a mapping process, the position information of the subword to one M-dimensional vector, where M is a predetermined hyperparameter. Then, the processor 402 may fuse the M-dimensional vector with a word vector of the subword, and input the fused vector to the self-attention model.

Preferably, the mapping process includes at least one of a calculation process based on a sine function, a calculation process based on a cosine function, a calculation process based on a sine function and a cosine function, and an operation based on a newly introduced trainable model parameter.

In another embodiment of the present invention, a non-transitory computer-readable recording medium having computer-executable instructions for execution by one or more processors is further provided. The execution of the computer-executable instructions cause the one or more processors to carry out a method for fusing position information. The method includes segmenting words of an input sentence to obtain a first sequence of words in the input sentence, and generating absolute position information of the words in the first sequence; segmenting subwords of the words in the first sequence to obtain a second sequence including subwords, and generating, based on the absolute position information of the words in the first sequence, to which the respective subwords belong, position information of the subwords in the second sequence; and fusing the position information of the subwords in the second sequence into a self-attention model to perform model training or model prediction.

As known by a person skilled in the art, the elements and algorithm steps of the embodiments disclosed herein may be implemented by electronic hardware or a combination of computer software and electronic hardware. Whether these functions are performed by hardware or software depends on the specific application and design constraints of the solution. A person skilled in the art may use different methods for implementing the described functions for each particular application, but such implementation should not be considered to be beyond the scope of the present invention.

As clearly understood by a person skilled in the art, for the convenience and brevity of the description, the specific working process of the system, the device and the unit described above may refer to the corresponding process in the above method embodiment, and detailed descriptions thereof are omitted here.

In the embodiments of the present application, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may be or may not be physically separated, and the components displayed as units may be or may not be physical units, that is to say, the units may be located in one place, or may be distributed across network units. Some or all of the units may be selected according to actual needs to achieve the objectives of the embodiments of the present invention.

In addition, each functional unit the embodiments of the present invention may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present invention, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present invention. The above storage medium includes various media that can store program codes, such as a USB flash drive, a mobile hard disk, a ROM, a RAM, a magnetic disk, or an optical disk.

The present invention is not limited to the specifically described embodiments, and various modifications, combinations and replacements may be made without departing from the scope of the present invention.

What is claimed is:

1. A method for fusing position information, the method comprising:
    segmenting words of an input sentence to obtain a first sequence of words in the input sentence, and generating absolute position information of the words in the first sequence;
    segmenting first sequence subwords of the words in the first sequence to obtain a second sequence including second sequence subwords, and generating, based on the absolute position information of the words in the first sequence, to which the respective first sequence subwords belong, position information of the second sequence subwords; and
    fusing the position information of the second sequence subwords into a self-attention model to perform model training or model prediction, wherein
        the generating of the position information of a second sequence subword from among the second sequence subwords includes
            calculating a relative distance between a target second sequence subword and a reference second sequence subword in the second sequence based on first absolute position information and second absolute position information; and
            generating, based on the relative distance, the position information of the target second sequence subword,
        the first absolute position information is the absolute position information of a target word in the first sequence, to which the target second sequence subword belongs, and
        the second absolute position information is the absolute position information of a reference word in the first sequence, to which the reference second sequence subword belongs.

2. The method for fusing position information as claimed in claim 1,
    wherein the fusing of the position information of the second sequence subword into the self-attention model includes
        mapping, with a mapping process, the position information of the target second sequence subword to three N-dimensional vectors that correspond respective input vectors Q, K and V of the self-attention model, where N is a predetermined hyperparameter; and fusing the three N-dimensional vectors with the respective input vectors Q, K and V, respectively, and inputting the fused vectors to the self-attention model.

3. The method for fusing position information as claimed in claim 2,
wherein the mapping process includes at least one of a calculation process based on a sine function, a calculation process based on a cosine function, a calculation process based on a sine function and a cosine function, and an operation based on a newly introduced trainable model parameter.

4. The method for fusing position information as claimed in claim 1,
wherein the generating of the position information of the second sequence subword includes
setting the absolute position information of the word in the first sequence, to which the second sequence subword belongs, as the position information of the second sequence subword.

5. The method for fusing position information as claimed in claim 4,
wherein the fusing of the position information of the second sequence subword into the self-attention model includes
mapping, with a mapping process, the position information of the second sequence subword to one M-dimensional vector, where M is a predetermined hyperparameter, and
fusing the M-dimensional vector with a word vector of the second sequence subword, and inputting the fused vector to the self-attention model.

6. The method for fusing position information as claimed in claim 5,
wherein the mapping process includes at least one of a calculation process based on a sine function, a calculation process based on a cosine function, a calculation process based on a sine function and a cosine function, and an operation based on a newly introduced trainable model parameter.

7. An apparatus for fusing position information, the apparatus comprising:
a memory storing computer-executable instructions; and
one or more processors configured to execute the computer-executable instructions such that the one or more processors are configured to
segment words of an input sentence to obtain a first sequence of words in the input sentence, and generate absolute position information of the words in the first sequence;
segment first sequence subwords of the words in the first sequence to obtain a second sequence including second sequence subwords, and generate, based on the absolute position information of the words in the first sequence to which the respective first sequence subwords belong, position information of the second sequence subwords; and
fuse the position information of the second sequence subwords into a self-attention model to perform model training or model prediction, wherein
the one or more processors are configured to generate the position information of a second sequence subword from among the second sequence subwords by
calculating a relative distance between a target second sequence subword and a reference second sequence subword in the second sequence based on first absolute position information and second absolute position information; and
generating, based on the relative distance, the position information of the target second sequence subword,
the first absolute position information is the absolute position information of a target word in the first sequence, to which the target second sequence subword belongs, and
the second absolute position information is the absolute position information of a reference word in the first sequence, to which the reference second sequence subword belongs.

8. The apparatus for fusing position information as claimed in claim 7,
wherein the one or more processors are configured to fuse the position information of the second sequence subword into the self-attention model by
mapping, with a mapping process, the position information of the target second sequence subword to three N-dimensional vectors that correspond respective input vectors Q, K and V of the self-attention model, where N is a predetermined hyperparameter; and
fusing the three N-dimensional vectors with the respective input vectors Q, K and V, respectively, and input the fused vectors to the self-attention model.

9. The apparatus for fusing position information as claimed in claim 8,
wherein the mapping process includes at least one of a calculation process based on a sine function, a calculation process based on a cosine function, a calculation process based on a sine function and a cosine function, and an operation based on a newly introduced trainable model parameter.

10. The apparatus for fusing position information as claimed in claim 7,
wherein the one or more processors are configured to generate the position information of the second sequence subword by
setting the absolute position information of the word in the first sequence, to which the subword belongs, as the position information of the subword.

11. The apparatus for fusing position information as claimed in claim 10,
wherein the one or more processors are configured to fuse the position information of the second sequence subword into the self-attention model by
mapping, with a mapping process, the position information of the subword to one M-dimensional vector, where M is a predetermined hyperparameter; and
fusing the M-dimensional vector with a word vector of the subword, and input the fused vector to the self-attention model.

12. The apparatus for fusing position information as claimed in claim 11,
wherein the mapping process includes at least one of a calculation process based on a sine function, a calculation process based on a cosine function, a calculation process based on a sine function and a cosine function, and an operation based on a newly introduced trainable model parameter.

13. A non-transitory computer-readable recording medium having computer-executable instructions to be executed by one or more processors, wherein, the computer-executable instructions, when executed, cause the one or more processors to carry out a method for fusing position information, the method comprising:

segmenting words of an input sentence to obtain a first sequence of words in the input sentence, and generating absolute position information of the words in the first sequence;

segmenting first sequence subwords of the words in the first sequence to obtain a second sequence including second sequence subwords, and generating, based on the absolute position information of the words in the first sequence, to which the respective first sequence subwords belong, position information of the second sequence subwords; and fusing the position information of the second sequence subwords into a self-attention model to perform model training or model prediction, wherein the generating of the position information of a second sequence subword from among the second sequence subwords includes calculating a relative distance between a target second sequence subword and a reference, second sequence subword in the second sequence based on first absolute position information and second absolute position information; and generating, based on the relative distance, the position information of the target second sequence subword, the first absolute position information is the absolute position information of a target word in the first sequence, to which the target second sequence subword belongs, and the second absolute position information is the absolute position information of a reference word in the first sequence, to which the reference second, sequence subword belongs.

14. The non-transitory computer-readable recording medium as claimed in claim 13, wherein the fusing of the position information of the second sequence subword into the self-attention model includes mapping, with a mapping process, the position information of the target second sequence subword to three N-dimensional vectors that correspond respective input vectors Q, K and V of the self-attention model, where N is a predetermined hyperparameter; and fusing the three N-dimensional vectors with the respective input vectors Q, K and V, respectively, and inputting the fused vectors to the self-attention model.

15. The non-transitory computer-readable recording medium as claimed in claim 14, wherein the mapping process includes at least one of a calculation process based on a sine function, a calculation process based on a cosine function, a calculation process based on a sine function and a cosine function, and an operation based on a newly introduced trainable model parameter.

16. The non-transitory computer-readable recording medium as claimed in claim 13, wherein the generating of the position information of the second sequence subword includes setting the absolute position information of the word in the first sequence, to which the second sequence subword belongs, as the position information of the second sequence subword.

17. The non-transitory computer-readable recording medium as claimed in claim 16, wherein the fusing of the position information of the second sequence subword into the self-attention model includes mapping, with a mapping process, the position information of the second sequence subword to one M-dimensional vector, where M is a predetermined hyperparameter; and fusing the M-dimensional vector with a word vector of the second sequence subword, and inputting the fused vector to the self-attention model.

\* \* \* \* \*